United States Patent [19]

Burger

[11] Patent Number: 4,489,421
[45] Date of Patent: Dec. 18, 1984

[54] DIGITAL MESSAGE TRANSMISSION SYSTEM EMPLOYING PULSE STUFFING AND HAVING TWO PLESIOCHRONIC SAMPLING CLOCKS

[75] Inventor: Erich Burger, Germering, Fed. Rep. of Germany

[73] Assignee: Siemens Aktiengesellschaft, Berlin & Munich, Fed. Rep. of Germany

[21] Appl. No.: 457,354

[22] Filed: Jan. 12, 1983

[30] Foreign Application Priority Data

Jan. 22, 1982 [DE] Fed. Rep. of Germany ....... 3201965

[51] Int. Cl.$^3$ .............................................. H04L 7/06
[52] U.S. Cl. ...................................... 375/112; 375/120
[58] Field of Search ........................ 375/25, 38, 81, 82, 375/112, 113, 120; 370/102, 106; 340/347 DD; 371/42, 46; 328/63, 72

[56] References Cited

U.S. PATENT DOCUMENTS

| | | | |
|---|---|---|---|
| 3,855,533 | 12/1974 | Schueli | 375/112 |
| 3,873,773 | 3/1975 | Guy, Jr. | 370/102 |
| 3,961,136 | 6/1976 | Cohen et al. | 375/112 |
| 3,970,796 | 7/1976 | Gyurki | 370/102 |
| 3,970,798 | 7/1976 | Epenoy et al. | 370/102 |
| 4,025,720 | 5/1977 | Pachynski, Jr. | 375/112 |
| 4,053,715 | 10/1977 | Drapkin | 370/102 |
| 4,072,987 | 2/1978 | Walker | 375/112 |

OTHER PUBLICATIONS

"Fundamental of Communications Using Pulse Code Modulation", H.-M. Christiansen et al., Siemens Review XLI (1974) pp. 257-262.
"Pulse Code Modulation and Multiplex Equipment for 30 and 120 Voice Circuits", J. Gier et al., Siemens Review XLI (1974), Special Issue, Communication Engineering, at pp. 269-275.

Primary Examiner—Robert L. Griffin
Assistant Examiner—Stephen Chin
Attorney, Agent, or Firm—Hill, Van Santen, Steadman & Simpson

[57] ABSTRACT

A digital message transmission system has a transmit side wherein two pulse sequences are sampled at the rate of two plesiochronic data clocks and the sampled sequences are expanded by the insertion of additional information in the manner of "positive stuffing." The two pulse sequences including the additional information are transmitted to the receive side in a pulse frame, the procedure being reversed at the proceed side to decode the message. The momentary phase relationship between the two plesiochronic data clocks, in the form of a binary phase word, is inserted as a portion of the additional information. An auxiliary clock signal is derived from a reference data clock signal for use in transforming the phase measurement (difference between a higher and a lower frequency level) into the binary phase word. An auxiliary plesiochronic clock signal, which is plesiochronic relative to the auxiliary clock signal, is derived from the reference data clock signal and the plesiochronic data clock signal (plesiochronic relative to the data clock signal), the auxiliary plesiochronic clock signal being compared in phase to the auxiliary clock signal.

11 Claims, 3 Drawing Figures

DIGITAL MESSAGE TRANSMISSION SYSTEM EMPLOYING PULSE STUFFING AND HAVING TWO PLESIOCHRONIC SAMPLING CLOCKS

BACKGROUND OF THE INVENTION

The present invention relates to digital message transmission systems, and in particular to a digital message transmission system wherein two pulse sequence sequences are sampled at the transmit side at the rate of two plesiochronic data clocks, the sampled sequences being expanded by the insertion of additional information by "positive stuffing", and wherein the two pulse sequences including the additional information are combined to form a sum pulse which is transmitted to the receive side in a pulse frame, and wherein the procedure is reversed at the receive side for decoding the message.

In a digital message transmission system utilizing plesiochronic data clocks for sampling respective pulse sequences, the signals obtained by the sampling are again plesiochronic, that is, the sampled signals exhibit a slight frequency deviation relative to one another. In order to combine plesiochronic pulse sequences and to transmit the combined sequences to the receive side, the bit repetition rate of the sum pulse sequence must be at least as large as the maximum sum of the frequencies of the individual pulse sequences. When the frequencies of the individual pulse sequences are not at their upper limit, some bit locations in the sum pulse sequence are not required by the individual pulse sequences. The non-utilized bit locations must be eliminated at the receive side so that the individual pulse sequences at the receive side may in turn be reconstructed without error. To that end, additional information bits to be transmitted from the transmit side to the receive side must be inserted in the sum pulse sequence at the transmit side. Additionally, another information bit or bits is (are) inserted into the sum pulse sequence making possible synchronization of the receive side receiving the sum pulse sequence with the pulse frame of the sum pulse sequence. As a result of these additional bits, the bit rate of the sum pulse sequence increases slightly above a minimum value. Such methods of inserting additional bits in an existing pulse sequence are known as "pulse stuffing" methods or "positive stuffing" as described, for example, in the articles "Fundamentals of Communications Using Pulse Code Modulation," H. M. Christiansen and R. Kersten and "Pulse Code Modulation and Multiplex Equipment for 30 and 120 Voice Circuits," J. Gier, L. Schweizer, and R. Senft, both published in Siemens Review XLI (1974), Special Issue "Communications Engineering" respectively at pages 257–262 and 269–275.

It is necessary to co-transmit suitable phase information in the sum pulse sequence for specific systems designs working with plesiochronic data clock signals wherein the original transmit side clock bits of the plesiochronic data clock signals are required again at the receive side, and must therefore be regained from the incoming sum pulse sequence.

SUMMARY OF THE INVENTION

It is an object of the present invention to provide a digital message transmission system wherein two pulse sequences are sampled at the transmit side at rates corresponding to two plesiochronic data clocks, and wherein the sampled signals are expanded by the insertion of additional information bits in the form of "positive stuffing" wherein the additional information is phase information.

The above object is inventively achieved wherein at least a portion of the additional information is the momentary phase relationship between the two plesiochronic data clock signals converted into a binary phase word. In order to obtain the binary phase word, a clock pulse generator connected to a phase locked control loop and synchronized to a data clock representing the reference data clock is provided at the transmit side. An auxiliary clock signal is derived from the clock pulse generator by means of a divider, and a mixer is provided having one input to which the sum of the reference data clock signal and the auxiliary clock signal is supplied, and having another input to which a plesiochronic data clock signal (plesiochronic relative to the reference data clock signal) is supplied. A plesiochronic auxiliary clock signal is generated at the mixer output (the plesiochronic auxiliary clock signal being plesiochronic relative to the auxiliary clock signal) and being compared therewith in phase.

The invention disclosed and claimed herein proceeds from the perception that, in order to gain the phase information to be transmitted from the transmit side to the receive side, the phase relationship between the two plesiochronic data clocks must first be measured at the transmit side. It would be possible in theory to execute this measurement with conventional counter arrangements functioning in a start-stop mode, meaning, for example, the counting operation would be started at a positive edge of one data clock pulse and ended at the next-successive positive edge of the other data clock signal. Such counter arrangements, however, would have the significant and practical disadvantage of requiring a very high counting frequency.

When, for example, the frequency of the two plesiochronic data clock signals is 8.488 MHz, with which two pulse sequences each of 8.448 KBit are sampled, and if the phase relationship between the two plesiochronic data clocks is coded as a binary four-place phase word, the counting frequency then amounts to $8.448 \text{ MHz} \cdot 2^4 = 135 \text{ MHz}$.

Moreover, circuits having such high counting frequencies require a relatively high component outlay as well as relatively high power consumption.

In accordance with the inventive principles disclosed and claimed herein, these difficulties and disadvantages associated with counter arrangements are avoided by reducing the high counting frequencies by means of generating a low-frequency auxiliary clock signal and a plesiochronic auxiliary clock signal (plesiochronic relative to the auxiliary clock signal) and undertaking a phase comparison between those two signals, the result of the phase comparison being at a significantly lower frequency level. The auxiliary clock signal is directly obtained from the phase locked control loop, whereas the plesiochronic auxiliary clock signal is obtained as a differential signal at the output of a mixer having one input to which a plesiochronic data clock signal is supplied and another input to which the sum of the reference data clock signal and the auxiliary clock signal is supplied.

The digital message transmission system disclosed and claimed herein may be utilized in broadcast technology, for example, in a data multiplexer in a radio relay means.

DESCRIPTION OF THE PREFERRED EMBODIMENTS

Figure 1:
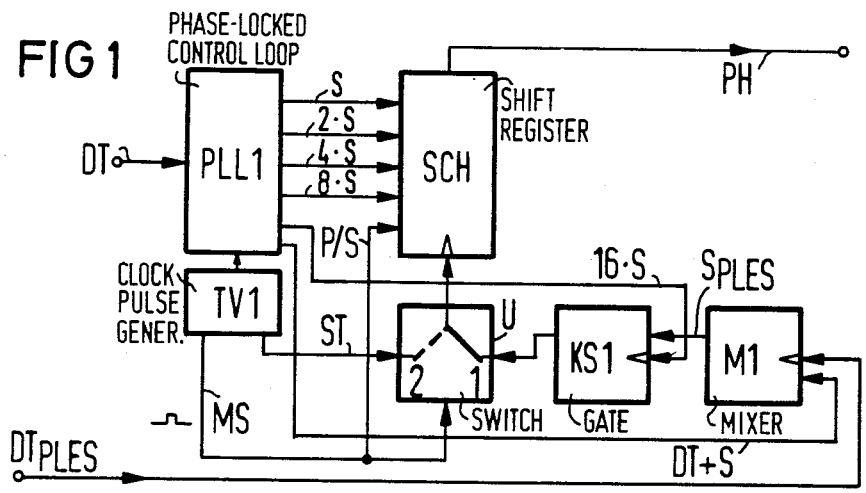
FIG. 1 is a schematic circuit diagram for the transmit side of a digital message transmission system constructed in accordance with the principles of the present invention for obtaining the phase relationship between two plesiochronic data clock signals.

The transmit side of a digital message transmission system constructed in accordance with the principles of the present invention is shown in FIG. 1. The transmit side includes a clock pulse generator TV1 which is synchronized to a reference data clock signal DT, and the output of which is supplied to a phase locked control loop PLL1 to which the reference data clock signal DT is also supplied. The phase locked control loop PLL1 is utilized to obtain the phase relationship between the reference data clock signal DT and a plesiochronic data clock signal $DT_{PLES}$, which is plesiochronic relative to the reference data clock signal DT.

An auxiliary clock signal is derived from the phase locked control loop PLL1 by means of a divider. A frequency of, for example, 128 kHz is preferable for the auxiliary clock signal S given frequencies of, for example 8.448 MHz for the reference data clock signal DT and the plesiochronic data clock signal $DT_{PLES}$.

The auxiliary clock signal S is compared with regard to phase with a plesiochronic auxiliary clock signal $S_{PLES}$, which is plesiochronic relative to the auxiliary clock signal S. For that purpose, the plesiochronic auxiliary clock signal $S_{PLES}$ must first be generated. This is achieved by means of a mixer M1 having a first input to which a sum data clock signal DT+S (derived by the addition of the reference data clock signal DT and the auxiliary clock signal S) and a second input to which the plesiochronic reference data clock signal $DT_{PLES}$ is supplied. As specified above, the frequency of the plesiochronic reference data clock signal $DT_{PLES}$ is also, for example, 8.448 MHz. The frequency of the sum clock signal is thus the sum of the frequencies of the reference data clock signal DT and the auxiliary clock signal S, namely 8.448 MHz + 127 kHz = 8.576 MHz. The plesiochronic auxiliary clock signal $S_{PLES}$ is obtained at the output of the mixer M1 as the differential signal of the two input values. Thus the frequency of the plesiochronic auxiliary clock signal $S_{PLES}$ is 128 kHz. In its function as a differentiator, the mixer $M_1$ may, for example, be a D-flip-flop.

The phase comparison is now undertaken in such a manner that the plesiochronic auxiliary clock signal $S_{PLES}$ obtained at the output of the mixer M1 simultaneously samples a number of in-phase signals respectively having $2^n$ (n=0, 1, 2 . . . (K-1)) times the frequency of the auxiliary clock signal S. As a result of this sampling, K sampling values, which represent the individual bits for the phase relationship coded as a binary phase word PH, are obtained. In the sample embodiment shown in FIG. 1, K is selected to be 4, so that the phase word PH exhibits four bits. With K=4, the in-phase signals S, 2·S, 4·S and 8·S are derived to serve as the signals respectively having $2^n$ times the frequency of the auxiliary clock signal S.

These in-phase signals S, 2·S, 4·S and 8·S proceed from the phase locked control loop PLL1 to a shift register SCH. The plesiochronic auxiliary clock signal $S_{PLES}$ proceeds from the output of the mixer M1 to a changeover means U, such as a switch, via a gate KS1, the purpose and operation of which is described below. The changeover means U has two switch positions 1 and 2 and is operated by a measuring signal MS having a measuring interval MI obtained from the clock pulse generator TV1. The changeover means U assumes the switch position 1 during the measuring interval MI, and assumes the other switch position 2 at all other times. At the switch position 1, the four sampling values obtained by the scanning are entered in parallel in the shift register SCH. When the changeover means U assumes the other switch position 2, corresponding to the range outside of the measuring interval MI, the four sampling values are serially emitted at the output of the shift register SCH by means of a shift clock signal ST, also supplied by the clock pulse generator TV1. An additional control line P/S for the shift register SCH is provided for alternate parallel-serial operation.

Figure 2:
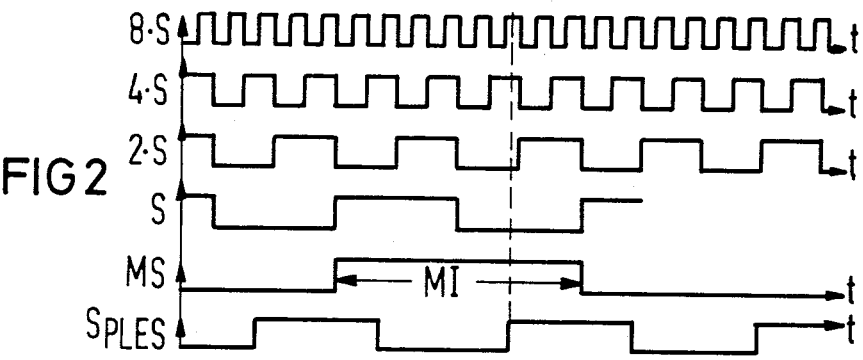
FIG. 2 is a pulse/time diagram showing various signals occurring in the operation of the circuit shown in FIG. 1.

A pulse/time diagram is shown in FIG. 2 showing the chronological arrangement of the measuring signal MS operating the changeover means U, the plesiochronic auxiliary clock signal $S_{PLES}$, and the four in-phase signals respectively having $2^0$, $2^1$, $2^2$ and $2^3$ times the frequency of the auxiliary clock signal S. Those four signals are respectively identified as S, 2·S, 4·S and 8·S.

The sampling occurs at the positive edge of a pulse in the plesiochronic auxiliary clock signal $S_{PLES}$. In FIG. 2, the first positive edge of the plesiochronic auxiliary clock signal $S_{PLES}$ falls in the range outside of the measuring interval M1 of the measuring signal MS. In this case, a sampling does not yet occur.

The next positive edge of the plesiochronic auxiliary clock signal $S_{PLES}$, however, does fall within the range of the measuring interval M1 of the measuring signal MS. This positive edge of the auxiliary plesiochronic clock signal $S_{PLES}$ now samples the signals S, 2·S, 4·S and 8·S. The sampling of the auxiliary clock signal S as well as the signal 2·S respectively produce a logical "0", whereas the sampling of the signals 4·S and 8·S respectively produce a logical "1". If the most significant bit of the binarily coded phase word PH is assigned, for example, to the auxiliary clock signal S and the least significant bit is assigned, for example, to the clock signal 8·S, the sampled values 1, 1, 0, 0 are deposited in parallel in the shift register SCH, beginning with the least significant bit. After switching of the changeover means U to the switch position 2, these four sampled values are serially emitted at the output of the shift register SCH by operation of the shift clock signal ST, so that a four-place binarily coded phase word 1100 is available for transmission.

The sampling operation may be complicated if the positive edge of a pulse of the plesiochronic auxiliary clock signal $S_{PLES}$ happens to coincide with an edge of one of the signals S, 2·S, 4·S or 8·S. In order to avoid an erroneous phase measurement as a result of such coincidence, the gate KS1 is provided between the mixer M1 and the changeover means U. A signal having $2^4$ times the frequency of the auxiliary clock signal S, namely the signal 16·S (obtained from the phase locked control loop PLL1) is supplied to an enabling input of the gate KS1. The plesiochronic auxiliary clock signal $S_{PLES}$ will thus only be available for sampling when its positive edge is within the measuring interval M1 and the signal 16·S simultaneously exhibits a logical "1". It is thus guaranteed that the positive edge of the plesiochronic auxiliary clock signal $S_{PLES}$ used in the sampling does not coincide with an edge of any of the signals S, 2·S, 4·S or 8·S to be sampled.

Figure 3:
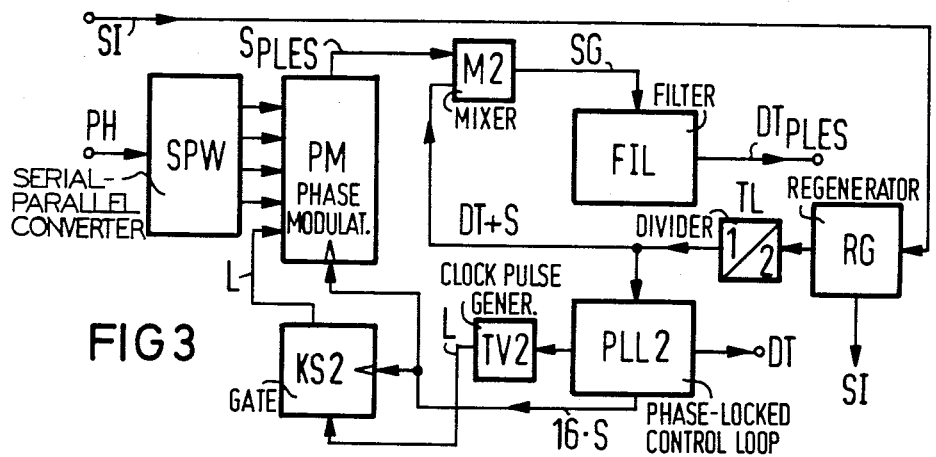
FIG. 3 is a schematic circuit diagram for the receive side of a digital message transmission system constructed in accordance with the principles of the present invention for regaining the plesiochronic data clock signals from the received pulse sequence.

The binary phase word PH obtained at the output of the shift register SCH is used as auxiliary information bits for insertion in a pulse sequence which is combined with a further pulse sequence to form a sum pulse sequence SI which arrives at the receive side of the transmission system in a pulse frame. The procedure for reconstructing the necessary signals at the receive side proceed in the reverse of the operations described in connection with the transmit side. An evaluation of the phase relationship is required in order to regenerate the reference data clock signal DT and the plesiochronic data clock signal $DT_{PLES}$. The circuit at the receive side for undertaking these operations is shown in FIG. 3.

In the circuit shown in FIG. 3, the incoming sum pulse sequence S1 first proceeds to a regenerator RG for clock signal regeneration, and subsequently to a divider TL having a division ratio of 2:1. The sum clock signal DT+S, consisting of the reference data clock signal DT and the auxiliary clock signal S is regained at the output of the divider TL. The reference data clock signal DT is directly generated from the sum clock signal DT+S by means of a second phase locked control loop PLL2. The second phase locked control loop PLL2 also generates a signal having $2^K$ times the frequency of the auxiliary clock signal S (for K=4, the generated signal is 16·S). The second phase locked control loop PLL2 also generates a load pulse L in combination with a second clock supply generator TV2. In accordance with the phase measurement cycle at the transmit side, the frequency of the load pulse L corresponds to $2^{-3}$ times the frequency of the auxiliary clock signal S. The frequency of the load pulse L, for example, given an auxiliary clock signal S frequency of 128 kHz amounts to 128 kHz/8=16 kHz.

The plesiochronic auxiliary clock signal $S_{PLES}$ must first be regained in order to generate the data clock signal $DT_{PLES}$ plesiochronic relative to the reference data clock signal DT. A phase modulator PM in the form of a K-stage binary divider (K=4) is provided for this purpose. The binary phase word PH derived from the sum pulse sequence SI is supplied to one input of the phase modulator PM via a serial-parallel converter SPW, and the load pulse L is supplied to another input of the phase modulator PM via a second gate circuit KS2. A signal 16·S derived from the second phase locked control loop PLL2 is supplied to the enabling input of the gate KS2 and the phase modulator PM. The load pulse L is thus only effective at the phase modulator PM when the signal 16·S exhibits a logical "1". The plesiochronic auxiliary clock signal $S_{PLES}$ is generated from the signal 16·S in the phase modulator PM operating as a four-place binary divider. To this end, the phase modulator PM is periodically loaded by the load pulse L with the four-place binary phase word PH. A change in the phase word PH results in a change of the phase position of the plesiochronic auxiliary clock signal $S_{PLES}$.

The plesiochronic auxiliary clock signal $S_{PLES}$ arising at the output of the phase modulator PM is combined in a mixer M2 with the sum clock signal DT+S consisting of the reference data clock signal DT and the auxiliary clock signal S. For this purpose, the mixer M2 may, for example, be an EXOR gate. The resulting signal SG at the output of the mixer M2 is supplied to a narrow band filter FIL from which the desired plesiochronic data clock signal $DT_{PLES}$ is filtered out. The filter FIL is preferably a non-linear phase locked control loop having a frequency-sensitive comparator and a phase-sensitive comparator.

Although modifications and changes may be suggested by those skilled in the art it is the intention of the inventor to embody within the patent warranted hereon all changes and modifications as reasonably and properly come within the scope of his contribution to the art.

I claim as my invention:

1. In a digital message transmission system for transmitting messages in the form of sum pulse sequences comprised of two component pulse sequences from a transmit side to a receive side of said system, said transmit side being supplied with first and second plesiochronic reference data clock signals for respectively sampling said two component pulse sequences, the improvement of a binary phase word generating means at said transmit side for deriving a binary word corresponding to the phase difference between said plesiochronic reference data clock signals for subsequent insertion in said component pulse sequences before transmission of said sum pulse sequence by pulse stuffing, and a means at said receive side for regaining said component pulse sequences and said plesiochronic reference data clock signals from a transmitted sum pulse sequence, said binary phase word generating means comprising:

a clock pulse generator;

a phase locked loop connected to said clock pulse generator and supplied with said first plesiochronic reference data clock signal and having a divider means for generating a first auxiliary clock signal;

a mixer having a first input to which a sum signal comprised of said first plesiochronic reference data clock signal and said auxiliary clock signal is supplied and a second input to which said second plesiochronic reference data clock signal is supplied, said mixer generating a second auxiliary clock signal plesiochronic with respect to said first auxiliary clock signal; and a means for comparing the phases of said first and second auxiliary clock signals, the result of the comparison being utilized for forming said binary phase word.

2. The digital message transmission system of claim 1 wherein said divider means generates K in-phase signals respectively having $2^n$ (n=0, 1, 2 ... (K−1)) times the frequency of said auxiliary clock signal, and wherein said means for comparing the phases of said first and second auxiliary clock signals samples each of said in-phase signals at a rate corresponding to said plesiochronic auxiliary clock signal and uses the respective bits obtained by said sampling as bits comprising said binary phase word.

3. The digital message transmission system of claim 2 wherein said clock pulse generator generates a measuring signal having a measuring interval and a shift clock signal, and wherein said binary phase word generating means further comprises:

a shift register connected to said phase locked loop; and a changeover means interconnected between said shift register and the output of said mixer, said changeover means being controlled by said measuring signal for permitting entry of said sampled values in parallel into said shift register only during said measuring interval and said shift clock pulse causing said sampled values to be serially emitted at an output of said shift register outside of the range of said measuring interval.

4. The digital message transmission system of claim 3 wherein said divider means generates an enabling signal having $2^K$ times the frequency of said auxiliary clock signal, and wherein said binary phase word generating means further comprises a gate circuit interconnected between the output of said mixer and said changeover means, said gate circuit having an enabling input to which said enabling signal is supplied such that said gate circuit permits sampling of said in-phase signals by said plesiochronic auxiliary clock signal only during said measuring interval and when said enabling signal assumes a selected logical value.

5. The digital message transmission system of claim 3 wherein said mixer is a D-flip-flop.

6. The digital message transmission system of claim 4 wherein said means at said receive side for regaining said component pulse sequences and said plesiochronic reference data clock signals comprises:
a means for regaining said sum signal to which said transmitted sum pulse sequence is supplied;
a second phase locked loop connected to an output of said means for regaining said sum signal, said second phase locked loop regenerating said first plesiochronic reference data clock signal and said enabling signal, and generating a load pulse;
a means controlled by said load pulse and by said enabling signal and to which said binary phase word is supplied for regenerating said plesiochronic auxiliary clock signal;
a second mixer having a first input to which said sum signal is supplied and having a second input to which said plesiochronic auxiliary clock signal is supplied; and
a filter connected to the output of said second mixer for filtering said second plesiochronic reference data clock signal from the output of said second mixer.

7. The digital message transmission system of claim 6 wherein said means for regaining said sum signal comprises a regenerator to which said transmitted sum pulse sequence is supplied and a divider connected to an output of said regenerator.

8. The digital message transmission system of claim 6 wherein said means for regenerating said plesiochronic auxiliary clock signal comprises a phase modulator in the form of a K-stage binary divider to which said enabling signal is supplied, said phase modulator being periodically loaded with said binary phase word by means of said load pulse.

9. The digital message transmission system of claim 6 wherein said means at said receive side for regaining said component pulse sequences and said plesiochronic reference data clock signals further comprises a second clock pulse generator connected to the output of said second phase locked loop for generating said load pulse in response to a signal from said phase locked loop, and a second gate circuit interconnected between said second clock pulse generator and said means for regenerating said plesiochronic auxiliary clock signal, said second gate circuit having an enabling input to which said enabling signal is supplied such that said load pulse is transmitted to said means for regenerating said plesiochronic auxiliary clock pulse signal only when said enabling signal assumes a selected logical state.

10. The digital message transmission system of claim 6 wherein said second mixer is an EXOR gate.

11. The digital message transmission system of claim 6 wherein said filter is a non-linear phase locked control loop having a frequency sensitive comparator and a phase-sensitive comparator.

* * * * *